Patented May 1, 1951

2,550,695

UNITED STATES PATENT OFFICE 2,550,695

HYDROGEN FLUORIDE CATALYZED POLYMERIZATION OF DIOLEFINS

John C. Hillyer and Joseph F. Wilson, Bartlesville, Okla., assignors to Phillips Petroleum Company, a corporation of Delaware No Drawing. Application October 11, 1948, Serial No. 53,995

3 Claims. (Cl. 260—94.2)

This invention relates to a process for the polymerization of monomeric material containing conjugated double bonds. In one embodiment it relates to the polymerization of conjugated diolefins in the presence of hydrofluoric acid as a catalyst. In one specific embodiment it relates to the polymerization of 1,3-butadiene in the presence of anhydrous hydrogen fluoride as a catalyst.

The polymerization of conjugated diolefins has long been known and practiced in the art and has furnished a basis for a vast and growing synthetic rubber industry. While the exact reaction mechanisms by which such polymerizations take place have not been fully established, it is generally agreed that either a free radical or an ionic type of reaction is involved. Those polymerizations which are initiated through the agency of free radicals and proceed by a chain reaction mechanism are typically carried out in aqueous emulsion, the reaction being originated in soap micelles. Procedures of this type have been widely used in the commercial production of synthetic elastomers. The ionic type of reactions are carried out in a mass polymerization process.

Ionic type polymerizations, wherein the monomeric material, such as a diolefin, is polymerized in mass, would apparently offer numerous advantages, such as the elimination of bulky emulsion systems in which extraneous constituents necessary to such means of operation comprise the major proportion of the reactor contents, shorter operating periods, and the like. However, as the polymerization reaction is exothermic in nature, the quantity of heat liberated is often of such magnitude as to render the reaction difficult or impossible to control when operating by a mass process. Furthermore, the product obtained by the mass process is frequently of undesirable quality because of degradation resulting from the elevated temperatures incurred, such degradation at times being extended to actual charring. This particular disadvantage has been largely overcome in emulsion type operations wherein a voluminous aqueous dispersing phase acts as an effective heat absorbing and exchanging medium. The use of an easily recoverable organic solvent for the diolefin in mass polymerization processes has, in some instances, provided a partial solution for this problem.

Another disadvantage encountered in mass polymerization operations has concerned the catalyst used. Heretofore, metallic sodium has been employed for this purpose with some success, however, removal of the catalyst from the polymerization product so produced has been a source of considerable difficulty. For many purposes it is essential that an ash-free, neutral product be obtained. Obviously such a material is difficult to prepare from a polymer permeated with particles of metallic sodium. Other catalysts, such as aluminum chloride, stannic chloride, or other metallic halides, have been suggested as mass or bulk polymerization catalysts, but for various reasons such catalysts have been unattractive.

In accordance with the present invention, a process has been discovered for effecting the mass or non-emulsion polymerization of alicyclic and aliphatic monomeric material containing conjugated double bonds to produce desirable polymers of uniform properties. According to a preferred embodiment of this invention, a conjugated diolefin, either per se or in solution in a suitable solvent, is contacted with a small quantity of anhydrous hydrogen fluoride at low temperature, by which means diolefin polymers are formed almost instantaneously. Control of the polymerization is readily effected at the low, generally sub-zero temperature levels employed in the process, thus leading to the production of products of uniform high quality. Removal of the hydrogen fluoride catalyst from the polymer is readily effected, thus providing an ash-free product, free from the undesirable alkaline reacting materials often obtained when operating with such a catalyst as metallic sodium. The polymers produced will generally be soft or liquid, suitable for use as rubber softeners, drying oils or drying oil additives or the like. However, when desired, the process can be modified to yield polymers which are elastic and rubber-like or, in some instances, even brittle solids. The liquid polymeric materials are generally clear, light in color and quite viscous. They are highly unsaturated and, in contact with air, dry readily to form films in a manner similar to that observed in vegetable drying oils, and may be employed for similar uses. By combination of portions of the liquid polymeric material, such as polybutadiene, of the present invention, with vegetable drying or semi-drying oils according to the method described in copending application Serial No. 44,596, filed August 16, 1948, by Hillyer and Marhofer, quick drying oils, which form hard films, are obtained. These liquid polymers also possess remarkable solvent properties and are particularly useful in the softening of rubbers, rubber reclaiming operations, and the like. Being highly unsaturated, these products will preferably be protected against oxidative degradation and hardening during storage by the addition of a suitable anti-oxidant.

Another advantageous feature of this process lies in its application to the production of true elastomers which exhibit properties similar to those typical of synthetic rubber. It has been well established that elastomers produced at low temperatures are markedly superior to those obtained from processes operating at higher levels. Since the present process involves operations at very low temperatures, generally well below those at which emulsion techniques, even with antifreeze additives, are convenient to apply, the advantages of this application of the invention will be apparent. Also, since polybutadiene or copolymers containing very high percentages of butadiene have been found to have superior properties for use under arctic conditions, this process is highly significant in the production of materials for such use.

It is an object of this invention to provide an improved process for effecting mass polymerization of monomeric materials containing conjugated double bonds. Another object is to provide an improved mass polymerization process for the polymerization of conjugated diolefins using a catalyst comprising anhydrous hydrogen fluoride. It is still another object to provide a process for the synthesis of polybutadiene, particularly in the form of soft polymers. Still another object of this invention is to provide an improved process for the mass polymerization of 1,3-butadiene in the presence of substantially anhydrous hydrogen fluoride as a catalyst. Other objects and advantages will be apparent to one skilled in the art from the accompanying disclosure and discussion.

In one specific embodiment of this process, 1,3-butadiene is contacted in the liquid phase with a small fraction of a molal proportion of anhydrous hydrogen fluoride at a temperature in the range between about −110 and +20° F. The butadiene will preferably be diluted with an inert hydrocarbon solvent therefor, such as isopentane, and the hydrogen fluoride may be introduced as a dispersion in a similar inert hydrocarbon, preferably the same as that used with the butadiene. During the addition the system is vigorously agitated by any suitable means, such as a turbo mixer, to provide efficient contacting. The polymerization occurs upon contacting of the butadiene with the hydrogen fluoride, the polymer separating in part from the mixture, the remainder remaining dissolved therein. Recovery of the polymer product may be effected by any suitable means, such as by filtration, distillation or the like. The unconverted butadiene, catalyst, and solvent, if present, may be recycled for further use if desired. Traces of catalyst are removed from the polymer, usually by washing with water or aqueous ammonia. This process may be carried out in a continuous, semi-continuous, or batch-wise manner.

When desired, the butadiene, cooled to the preferred operating temperature, may be placed in a suitable tank or reaction vessel and agitated vigorously. Hydrogen fluoride is then introduced via a multiplicity of small openings or jets in a manner such that a fine dispersion is obtained. Thus, thorough contacting is insured and local heat buildup is avoided. As in the foregoing embodiment, polymerization is effected immediately upon contact. Reversal of the order of addition, that is, addition of diolefin to hydrogen fluoride, can be practiced, but, because of the unfavorable ratio of diolefin to catalyst, is a less desirable procedure.

The method of this invention can be adjusted to the production of polymers which are soft or liquid materials or of crumb-like solids of the true elastomer type. This adjustment is effected principally by varying the degree of dispersion of the catalyst. That is, by supplying the anhydrous hydrogen fluoride to the reaction in very fine dispersion, liquid polymers form the principal product, while with a coarser dispersion the majority of the polymer will be a solid crumb. Obviously, when the dispersion is uneven, both forms are obtained in proportions varying with the variation in dispersion. It has been found that by dispersion of the catalyst in an inert hydrocarbon prior to its introduction into the system, more precise control of the polymer type can be effected.

The temperatures employed may be, as previously mentioned, between −110 and +20° F. However, it is preferred to operate in the range between −50 and −20° F., since at very low temperatures the reaction is too slow for practical purposes and at higher levels the polymerization proceeds at a rate often difficult to control. The reaction time may vary from a few minutes to 10 hours or more, depending upon factors such as the temperature used, ratio of monomer to catalyst, or the like, but usually a time of from ½ to 5 hours is satisfactory.

The ratio of the monomeric material to hydrogen fluoride employed may vary within rather broad limits, generally between 1:1 and 25:1 or more, and preferably between 2:1 and 10:1 on a mol basis. Since the hydrogen fluoride does not enter into the reaction to a significant extent but acts only as a catalyst, it is desirable from an economic viewpoint to employ amounts of catalyst as small as practicable although larger amounts do not interfere with the reaction or harm the product. When a very large monomeric material to hydrogen fluoride ratio is used, the reaction rate is reduced below practical limits. Since the ratios given are mol ratios and since the molecular weight of the simplest diolefin, 1,3-butadiene, is nearly three times that of hydrogen fluoride, it is obvious that the weight ratios of diolefin to hydrogen fluoride are much greater than the mol ratios herein disclosed.

Most advantageous operation is obtained by employing an inert hydrocarbon to facilitate contacting of diolefin with catalyst and aid in removal of the heat of reaction. By so operating the polymerization can be more effectively controlled and more uniform product characteristics realized. The paraffin hydrocarbons in the $C_4$ to $C_7$ range are suitable for this purpose. In general, it is preferred to use an intermediate member of this group, specifically isopentane, which can be more readily handled and recovered than, say, butane, and does not require as high a temperature for recovery as, say, n-heptane. The quantity of inert hydrocarbon employed will preferably be in excess of the quantity of diolefin, usually comprising from about 60 to about 90 per cent of the total weight of the monomeric material. It has been found that the yield of polymer is most advantageous when the mol ratio of inert hydrocarbon to monomeric material is from about 1.5:1 to about 5:1. Above this ratio the quantity of polymer produced falls markedly. As previously pointed out, the hydrogen fluoride may be dispersed in a solvent and the dispersion so obtained admixed with the monomeric material solution.

After separation of the polymeric material which is not dissolved in unconverted diolefin or inert hydrocarbon, that portion of the polymer in solution is recovered by removal of the diolefin and/or inert hydrocarbon by distillation or the like. In the distillation operation, the hydrogen fluoride is removed overhead and can be recovered for further use.

The aliphatic or alicyclic conjugated monomeric materials, such as diolefins or cyclodiolefins, applicable for the present process include, for example, 1,3-butadiene; isoprene; 1,3-pentadiene; alkyl substituted conjugated diolefins, such as 2-methyl-1,3-butadiene, 2,3-dimethyl-1,3-pentadiene, 2-ethyl-1,3-butadiene, 2-methyl-3-propyl-1,3-butadiene, and the like; 1,3-cyclopentadiene; 1,3-cyclohexadiene, and the like; halogen substituted 1,3-butadienes, such as 2-chloro and 2-bromo-1,3-butadiene, and the like; alkyl and halogen substituted 1,3-butadiene, such as 2-chloro-1-methyl-1,3-butadiene, and the like. The monomeric materials applicable to the present invention are limited to aliphatic and alicyclic monomeric materials containing conjugated double bonds having at least four and not more than 15 carbon atoms per molecule, but it is preferable to use monomeric materials having between 4 and 10 carbon atoms per molecule. A hydrogen stream from any suitable source, such as from a dehydrogenation process, containing a desired diolefin may be employed. However, mono-olefins should generally not be present in such streams since they may react with the hydrogen fluoride to produce alkyl fluorides, thus destroying its catalytic effect for the polymerization.

The following examples illustrate the process of the present invention.

EXAMPLE I

Thirty-one grams of anhydrous hydrogen fluoride were added to 53 grams of 1,3-butadiene with vigorous stirring. The temperature was maintained at 14° F. A vigorous reaction occurred as the hydrogen fluoride was contacted with the butadiene. A quantitative yield of viscous yellow polymer was obtained.

EXAMPLE II

Polymerization of 1,3-butadiene was carried out in isopentane at −108° F. using various isopentane to butadiene and hydrogen fluoride to butadiene ratios. Polymer was obtained as shown in Table 1 as follows:

*Table 1*

| Mol Ratios | | Reaction Time, Hours | Per cent Polymer Yield Based On Butadiene Charged |
|---|---|---|---|
| Isopentane/Butadiene | Butadiene/HF | | |
| 9.7 | 14 | 5.2 | 1 |
| 13.7 | 4.3 | 4.0 | 17 |
| 3.1 | 15.8 | 5.5 | 19 |
| 1.9 | 9.9 | 3.5 | 24 |
| 0.8 | 11.3 | 6.0 | 40 |
| 3.2 | 4.1 | 3.5 | 84 |

EXAMPLE III 1,3-butadiene was dissolved in isopentane in a ratio of 1.0:1.5 and cooled to −40° F. To this solution was added anhydrous hydrogen fluoride to provide a butadiene to hydrogen fluoride mol ratio of 4.3. Butadiene conversion was approximately 50 per cent and the product obtained comprises 82 per cent liquid polymer and 18 per cent a typical synthetic rubber crumb.

EXAMPLE IV

A quantity of 1,3-butadiene was agitated with anhydrous hydrogen fluoride at −108° F., the ratio of butadiene to hydrogen fluoride being 1:0.2 on a mol basis. At the end of 4.5 hours no visible polymer had been formed. The temperature was then allowed to rise slowly. Vigorous reaction was initiated between −40 and −35° F. and a yield of 20 per cent of polymer was formed in a few minutes.

A second run was carried out using a mol ratio of 1,3-butadiene to hydrogen fluoride of 1.0:0.36. The butadiene and catalyst were combined at a temperature of −108° F. and the temperature again allowed to rise slowly. At about −40° F. a vigorous polymerization reaction was initiated. The temperature was lowered again, upon which the reaction subsided, becoming active again at −40° F. as the temperature was allowed to rise. This was repeated several times with substantially identical results. At the end, a substantially quantitative yield of a straw colored, viscous liquid polymer was recovered. This polymer showed no combined fluorides and upon testing exhibited excellent properties as a drying oil constituent.

It is to be understood that this invention should not be unnecessarily limited to the above discussion and description and that modifications and variations may be made without departing from the invention or from the scope of the claims.

What is claimed is:

1. An improved mass polymerization process for the production of polybutadiene which comprises passing a mixture comprising butadiene and a paraffin hydrocarbon material containing at least 4 and not more than 7 carbon atoms per molecule as a solvent for said butadiene into a reaction zone maintained at a temperature in the range of −110 to +20° F., the mol ratio of said solvent to said butadiene being in the range of 1.5:1 to 5:1, contacting said mixture contained in said reaction zone with anhydrous hydrogen fluoride as catalyst whereby said butadiene is polymerized, maintaining the mol ratio of butadiene to said hydrogen fluoride catalyst in the range of 1:1 to 25:1, and recovering polybutadiene as a product of the process.

2. An improved mass polymerization process for the production of polymeric material which comprises passing a mixture comprising monomeric material containing conjugated double bonds having at least 4 and not more than 15 carbon atoms per molecule and a paraffin hydrocarbon material containing at least 4 and not more than 7 carbon atoms per molecule as a solvent for said monomeric material into a reaction zone maintained at a temperature in the range of −110 to +20° F., the mol ratio of said solvent to said monomeric material being in the range of 1.5:1 to 5:1, contacting said mixture contained in said reaction zone with a catalyst consisting of anhydrous hydrogen fluoride, maintaining the mol ratio of said monomeric material to said hydrogen fluoride catalyst in the range of 1:1 to 25:1, and recovering polymeric material as a product of the process.

3. An improved mass polymerization process for the production of polybutadiene, which comprises passing a mixture of butadiene and isopentane into a reaction zone maintained at a temperature in the range of from −110 to +20° F., the mol ratio of said isopentane to said butadiene being in the range of 1.5:1 to 5:1, contacting said mixture in said reaction zone with anhydrous hydrogen fluoride as a catalyst whereby said butadiene is polymerized, maintaining the mol ratio of butadiene to said hydrogen fluoride catalyst in the range of 1:1 to 25:1, and recovering polybutadiene as a product of the process.

JOHN C. HILLYER.
JOSEPH F. WILSON.

REFERENCES CITED

The following references are of record in the file of this patent:

UNITED STATES PATENTS

| Number | Name | Date |
|---|---|---|
| 2,460,973 | Calfee et al. | Feb. 8, 1949 |